(12) United States Patent
Breitfeld et al.

(10) Patent No.: US 8,985,686 B2
(45) Date of Patent: Mar. 24, 2015

(54) HEIGHT ADJUSTABLE DEVICE COMPRISING MULTI-PART OUTPUT MEANS

(75) Inventors: Uwe Breitfeld, Duesseldorf (DE); Frank Triebeneck, Nuertingen (DE)

(73) Assignee: Johnson Controls Technology Company, Holland, MI (US)

( * ) Notice: Subject to any disclaimer, the term of this patent is extended or adjusted under 35 U.S.C. 154(b) by 364 days.

(21) Appl. No.: 13/203,657

(22) PCT Filed: Feb. 19, 2010

(86) PCT No.: PCT/EP2010/001055
§ 371 (c)(1),
(2), (4) Date: Nov. 11, 2011

(87) PCT Pub. No.: WO2010/097184
PCT Pub. Date: Sep. 2, 2010

(65) Prior Publication Data
US 2012/0043799 A1 Feb. 23, 2012

(30) Foreign Application Priority Data
Feb. 27, 2009 (DE) .......................... 10 2009 010 689

(51) Int. Cl.
*B60N 2/42* (2006.01)
*B60N 2/16* (2006.01)
*B60N 2/02* (2006.01)

(52) U.S. Cl.
CPC .............. *B60N 2/165* (2013.01); *B60N 2/1615* (2013.01); *B60N 2002/0236* (2013.01)
USPC ................. 297/216.16; 297/344.15

(58) Field of Classification Search
None
See application file for complete search history.

(56) References Cited

U.S. PATENT DOCUMENTS

| 3,877,319 | A | * | 4/1975 | Cooper | 74/492 |
| 4,171,036 | A | * | 10/1979 | Plaat | 188/196 R |
| 4,371,207 | A | * | 2/1983 | Wilking et al. | 297/344.15 |
| 5,476,284 | A | * | 12/1995 | DuRocher et al. | 280/777 |
| 5,938,265 | A | * | 8/1999 | Oyabu et al. | 296/68.1 |
| 6,250,705 | B1 | * | 6/2001 | Zuch | 296/68.1 |
| 6,334,643 | B1 | * | 1/2002 | Lindblad et al. | 296/65.09 |
| 6,352,006 | B1 | * | 3/2002 | Kurashita | 74/409 |
| 7,604,293 | B2 | * | 10/2009 | Matsuhashi | 297/216.2 |
| 8,047,919 | B2 | * | 11/2011 | Arden et al. | 464/32 |
| 8,074,956 | B2 | * | 12/2011 | Wang et al. | 248/688 |

(Continued)

FOREIGN PATENT DOCUMENTS

DE 20023595 U1 2/2005
DE 20221460 U1 1/2006

(Continued)

OTHER PUBLICATIONS

International Search Report for application No. PCT/EP2010/2010001055 mailed Aug. 26, 2010.
Japanese Office Action mailed May 7, 2013.

*Primary Examiner* — David E Allred
(74) *Attorney, Agent, or Firm* — Fletcher Yoder, P.C.

(57) ABSTRACT

A vehicle seat comprises an adjusting element having an output with a driving gearwheel and an output gearwheel. The gearwheels are connected to each other for conjoint rotation. The output gearwheel interacts with a fitting part in an interlocking and/or frictional manner. The driving gearwheel and the output gearwheel comprise multiple pieces.

4 Claims, 1 Drawing Sheet

(56) References Cited

U.S. PATENT DOCUMENTS

2002/0074842 A1* 6/2002 Dankowski et al. ..... 297/344.17
2002/0145315 A1* 10/2002 Fraley et al. ............. 297/216.13
2003/0146061 A1* 8/2003 Tournier ....................... 188/373
2008/0169696 A1* 7/2008 Kojima et al. ............. 297/378.1

FOREIGN PATENT DOCUMENTS

| | | |
|---|---|---|
| DE | 10 2007 037712 A1 | 8/2008 |
| EP | 2 003 357 A2 | 12/2008 |
| FR | 2896195 A1 | 7/2007 |
| JP | 2003056674 | 2/2003 |

* cited by examiner

HEIGHT ADJUSTABLE DEVICE COMPRISING MULTI-PART OUTPUT MEANS

CROSS REFERENCE TO RELATED APPLICATIONS

This application claims priority from and the benefit of PCT Application No. PCT/EP2010/001055, filed on Feb. 19, 2010 and German Patent DE 10 2009 010 689.8, filed on Feb. 27, 2009; both entitled "HEIGHT ADJUSTABLE DEVICE COMPRISING MULTI-PART OUTPUT MEANS", which are herein incorporated by reference.

BACKGROUND

The present invention relates to a vehicle seat with an adjusting element which has an output means with a driving gearwheel and an output gearwheel, which are connected to each other for conjoint rotation, wherein the output gearwheel interacts with an adjusting means in an interlocking and/or frictional manner.

Vehicle seats as disclosed, for example, in German utility model DE 295 21 946 U1 nowadays frequently have a height adjustable device with which the height of the seat surface can be adjusted by motor or manually. However, said height adjustable devices are frequently comparatively heavy and therefore increase the energy consumption of the vehicle.

It was therefore the object of the present invention to provide a vehicle seat which does not have the disadvantages of the prior art.

The object is achieved by a vehicle seat with an adjusting element which has an output means with a driving gearwheel and an output gearwheel, which are connected to each other for conjoint rotation, wherein the output gearwheel interacts with an adjusting means in an interlocking and/or frictional manner, and the driving gearwheel and the output gearwheel are provided in multiple pieces.

SUMMARY

The present invention relates to a vehicle seat. Said vehicle seat may be the driver's or passenger's seat but also a seat arranged in the rear seat rows. Such a seat may provide space for one or more people. The vehicle seat according to the invention may consequently also be a seat bench.

According to the invention, said vehicle seat has a adjusting element with which one part of the seat can be adjusted relative to another part of the seat and/or relative to the vehicle bodywork. Said adjusting element is preferably used to adapt the height and/or the inclination of the seat part of the vehicle seat to the particular seat occupant. Said adjusting element has an output means which is provided with a driving gearwheel and an output gearwheel, which are connected to each other for conjoint rotation. According to the invention, the output gearwheel interacts with an adjusting means, for example with a fitting of the vehicle seat, in an interlocking and/or frictional manner. In the case of a seat height or seat inclination adjustment, said fitting is arranged, for example, rotatably on the vehicle bodywork and preferably has a toothed ring which interacts with the output gearwheel in an interlocking and/or frictional manner.

According to the invention, the driving gearwheel and the output gearwheel are now provided in multiple pieces, i.e. at least two parts are involved. In particular, a distance is provided between the output gearwheel and the driving gearwheel. Said distance is preferably spanned by a connecting element to which both the driving gearwheel and the output gearwheel are connected in an interlocking, frictional and/or integrally bonded manner.

The connecting element is preferably a tube. A tube within the context of the invention is an internally hollow, comparatively thin-walled element which can have an arbitrary cross section. Preferably, however, the tube has an at least substantially round cross section.

The connecting element is preferably a predetermined deformation point which deforms in the event of an accident and, in the process, dissipates energy. As a result, for example, the teeth of the gearwheels are not deformed or sheared off to an extent such that an uncontrolled movement of the seat occurs. By means of the provision of the connecting element in the form of a predetermined deformation element, the safety of the vehicle seat according to the invention is substantially increased and injury of the vehicle occupants is avoided.

In a preferred embodiment of the present invention, the output gearwheel is produced by means of cold extrusion and/or precision punching.

According to a further preferred embodiment of the present invention, the driving gearwheel is produced by means of cold extrusion and/or precision punching.

The adjusting element is furthermore preferably a seat height adjuster with which the seat surface and the backrest of the vehicle seat according to the invention are adjusted in height and/or inclination thereof.

DRAWINGS

The invention is explained below with reference to FIGS. 1 and 2. Said explanations are merely by way of example and do not restrict the general inventive concept.

DETAILED DESCRIPTION

Figure 1:
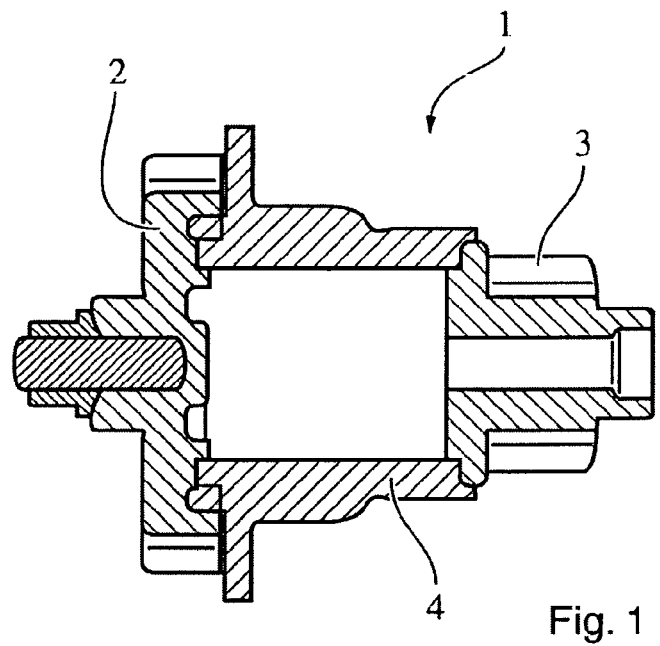
FIG. 1 shows the output means.

FIG. 1 shows the output means of the vehicle seat according to the invention. Said output means has a driving gearwheel 2 and an output gearwheel 3. Said two gearwheels are connected to each other by a connecting element 4, here a tube with a circular cross section, for conjoint rotation. There is a significant saving on weight owing to the fact that the tube has an internally hollow cross section. In the present case, the tube is configured as a predetermined deformation element which, in the event of an accident, becomes distorted or twists and thereby dissipates accident energy. This prevents excessive damage to the gearwheels 2, 3, which could lead to an uncontrolled movement of the vehicle seat. For example, this prevents the teeth of the gearwheels 2 and/or 3 from shearing off. In the present case, the output gearwheel 3 is produced by cold extrusion and the driving gearwheel 2 is produced by means of precision punching. In the present case, the output means is part of a height adjustable device, in which a rotational movement is applied manually and/or by motor to the gearwheel 2 and is transmitted to the gearwheel 3 by the connecting element 4. Said gearwheel 3 then interacts, for example, with a fitting part (see FIG. 2), i.e. it rolls thereon and thereby moves the vehicle seat up or down and/or adjusts the inclination of the seat surface.

Figure 2:
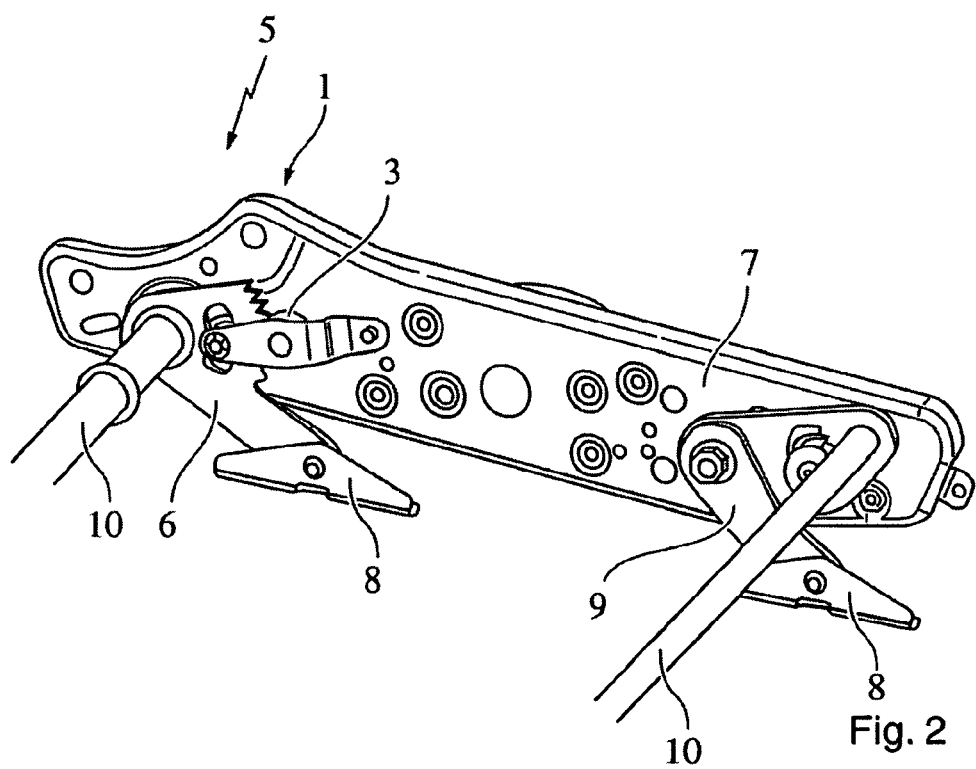
FIG. 2 shows part of the vehicle seat according to the invention.

This connection can be seen somewhat better in FIG. 2, in which one of the two side parts 7 of a vehicle seat and the two transverse struts 10, which are located between the side parts 7, are illustrated. The rear transverse strut is mounted on the fitting part 6. In the front region, the side part 7 is mounted by means of the lever arm 9. Both the fitting part 6 and the lever arm 9 are connected in each case rotatably to the vehicle bodywork by means of bearings 8. This illustration furthermore shows the output gearwheel 3 of the output means 1, which interacts in an interlocking and/or frictional manner with a toothed ring which is located on the fitting part 6. By rotation of the output gearwheel 3, the latter rolls on the toothed ring and moves the fitting part 6 in the clockwise or counterclockwise direction. As a result, the vehicle seat is raised or lowered. The output gearwheel 3 is part of the output means 1 which is illustrated in FIG. 1.

LIST OF REFERENCE SYMBOLS

1 Output means
2 Driving gearwheel
3 Output gearwheel
4 Connecting element, tube
5 Adjusting element, height adjuster
6 Fitting part
7 Side plate
8 Rotary bearing
9 Lever arm
10 Transverse struts

The invention claimed is:

1. A vehicle seat comprising an adjusting element which has an output with a driving gearwheel and an output gearwheel, which are connected to each other for conjoint rotation, wherein the output gearwheel interacts with a fitting part in an interlocking and/or frictional manner, and wherein the driving gearwheel and the output gearwheel are formed as respective single pieces that are separated from one another within the adjusting element;

wherein a single-piece connecting element is arranged between the driving gearwheel and the output gearwheel, the connecting element has a first longitudinal end directly coupled to the driving gearwheel and a second longitudinal end directly coupled to the output gearwheel, the connecting element has an internally hollow cross section that extends along an entire length of the connecting element from the first longitudinal end to the second longitudinal end, and the connecting element is configured as a predetermined deformation element configured to dissipate energy via distortion or twisting.

2. The vehicle seat as claimed in claim 1, wherein the output gearwheel is cold extruded and/or precision punched.

3. The vehicle seat as claimed in claim 1, wherein the driving gearwheel is cold extruded and/or precision punched.

4. The vehicle seat as claimed in claim 1, wherein the adjusting element is a seat height adjuster.

\* \* \* \* \*